(12) United States Patent
Loscher

(10) Patent No.: US 8,087,146 B2
(45) Date of Patent: Jan. 3, 2012

(54) TRANSMISSION CLUTCH ASSEMBLY FIXTURE

(75) Inventor: Frank Loscher, Tecumseh (CA)

(73) Assignee: GM Global Technology Operations LLC, Detroit, MI (US)

( * ) Notice: Subject to any disclaimer, the term of this patent is extended or adjusted under 35 U.S.C. 154(b) by 1029 days.

(21) Appl. No.: 11/971,992

(22) Filed: Jan. 10, 2008

(65) Prior Publication Data

US 2009/0179367 A1    Jul. 16, 2009

(51) Int. Cl.
*B23Q 3/00* (2006.01)
*B25B 3/00* (2006.01)
*B25B 27/00* (2006.01)

(52) U.S. Cl. ............... 29/468; 29/274; 269/40

(58) Field of Classification Search .......... 29/274, 29/271, 721, 559, 466, 467, 468, 464, 428; 269/40
See application file for complete search history.

(56) References Cited

U.S. PATENT DOCUMENTS 3,686,739 A     8/1972 Manero
5,916,200 A *   6/1999 Eppley et al. ............ 604/178

* cited by examiner

*Primary Examiner* — John C Hong
(74) *Attorney, Agent, or Firm* — Quinn Law Group, PLLC

(57) ABSTRACT

A fixture to align the inner splines of a plurality of clutch plates within a clutch housing assembly, the fixture including: a central body; a first fixed finger rigidly attached to a first fixed portion of the central body; and a first movable finger rigidly attached to a first movable portion of the central body. The first movable finger oscillates back and forth relative to the first fixed finger, to assist the alignment of the plurality of clutch plates within the clutch housing assembly. The fixture also centers and locks the plurality of clutch plates in the correct alignment position.

15 Claims, 3 Drawing Sheets

TRANSMISSION CLUTCH ASSEMBLY FIXTURE

TECHNICAL FIELD

The invention relates in general to a fixture that aligns a plurality of splined plates within an assembly. More particularly, it relates to a fixture that centers, aligns and locks the inner splines of a plurality of clutch plates of a clutch housing assembly.

BACKGROUND OF THE INVENTION

A motor vehicle transmission typically has a number of clutch assemblies that are turned off and on to vary the reduction ratio of the transmission. The clutch assembly includes a plurality of clutch plates with inner and outer splines that are placed in a housing. The outer splines are aligned as the clutch plates are placed in the housing, however, the inner splines of multiple sets of clutch plates remain unaligned.

SUMMARY OF THE INVENTION

An efficient way of aligning the inner splines of a plurality of clutch plates in a clutch housing assembly prior to installation of the clutch housing assembly into the transmission is provided. The invention relates to a fixture that centers, aligns and locks the inner splines of a plurality of clutch plates of a clutch housing assembly, to assist the installation of the clutch housing assembly into the transmission.

A fixture is provided for aligning the inner splines of a plurality of plates within an assembly, including: a central body; a first fixed finger rigidly attached to a first fixed portion of the central body; and a first movable finger rigidly attached to a first movable portion of the central body. The first movable finger is free to rotate or oscillate back and forth relative to the first fixed finger to assist the alignment of the plurality of plates within the assembly.

In one aspect of the invention, the first movable portion is attached to the first fixed portion through at least one bearing joint. In another aspect of the invention, the first fixed finger and the first movable finger are integrally formed with the first fixed portion and the first movable portion, respectively, of the central body.

In another aspect of the invention, the fixture further includes: a second and third fixed finger integrally formed or rigidly attached to a second and third fixed portion of the central body; and a second and third movable finger integrally formed or rigidly attached to a second and third movable portion of the central body. The second and the third movable fingers rotate or oscillate back and forth relative to the second and the third fixed fingers to assist the alignment of the plurality of plates within the assembly. The first, second and third fixed and movable fingers are arranged substantially symmetrically around the central body and are aligned substantially parallel to one another.

In another aspect of the invention, the assembly is a clutch housing assembly including: a first set of clutch plates having first inner spline teeth; and a second set of clutch plates having second inner spline teeth. In another aspect of the invention, the first fixed finger and the first movable finger have a variable cross-section including an upper portion and a lower portion. The upper portion of the first fixed finger and the first movable finger includes a first tapered section and a first straight section having a first protrusion. The lower portion of the first fixed finger and the first movable finger includes a second tapered section and a second straight section having a second protrusion. The first protrusion is configured to engage with the first inner spline teeth of the first set of clutch plates, while the second protrusion is configured to engage with the second inner spline teeth of the second set of clutch plates.

In another aspect of the invention, the first set of clutch plates have an inside diameter exceeding an upper outer diameter of the fixture. The second set of clutch plates have an inside diameter exceeding a lower outer diameter of the fixture, such that the clutch housing assembly is sufficiently fittable over the fixture.

In another aspect of the invention, the clutch housing assembly is placed onto the fixture and the first movable finger rotates or oscillates back and forth allowing the first and the second inner spline teeth to locate and register around the first and the second protrusions, respectively, thereby aligning them. Each plate within the first set of clutch plates descends by gravity down and around the first protrusion as its first inner spline teeth registers around the first protrusion, allowing a plate above it within the first set of clutch plates to be aligned in turn. Each plate within the second set of clutch plates descends by gravity down and around the second protrusion as its second inner spline teeth registers around the second protrusion, allowing a plate above it within the second set of clutch plates to be aligned in turn.

In another aspect of the invention, a centering post is provided to center the clutch housing assembly as the clutch housing assembly is placed over the fixture. In another aspect of the invention, the oscillation or rotation of the movable finger defines an angle of oscillation of approximately 8 degrees.

In another aspect of the invention, the first and second protrusions on the fixed and movable fingers have an opposite orientation or are fully indexed to allow the alignment of the inner spline teeth to be held in place, i.e., to prevent the clutch plates in the first and second sets of clutch plates from rotating further and losing the correct alignment. Thus, the first protrusion on the first movable finger hooks onto one edge of the first inner spline teeth of the first set of clutch plates and the first protrusion on the first fixed finger hooks onto a remaining other edge of the first inner spline teeth of the first set of clutch plates. Additionally, the second protrusion on the first movable finger hooks onto one edge of the second inner spline teeth of the second set of clutch plates, while the second protrusion on the first fixed finger hooks onto a remaining other edge of the second inner spline teeth of the second set of clutch plates.

In another aspect of the invention, the fixture further includes a control feature to allow the movable fingers to be stopped at the maximum point of travel, i.e., when the respective inner spline teeth have registered around the first and second protrusions, to ensure that the clutch plates are fully aligned prior to being locked into this position.

In another aspect of the invention, the clutch housing assembly further includes a housing enclosing a circuit to allow flow of fluid. The first set and the second set of clutch plates are locked into position by introducing compressed air into the circuit once the clutch housing assembly is fully seated onto the fixture. A method of aligning a plurality of clutch plates within a clutch housing assembly is also provided.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
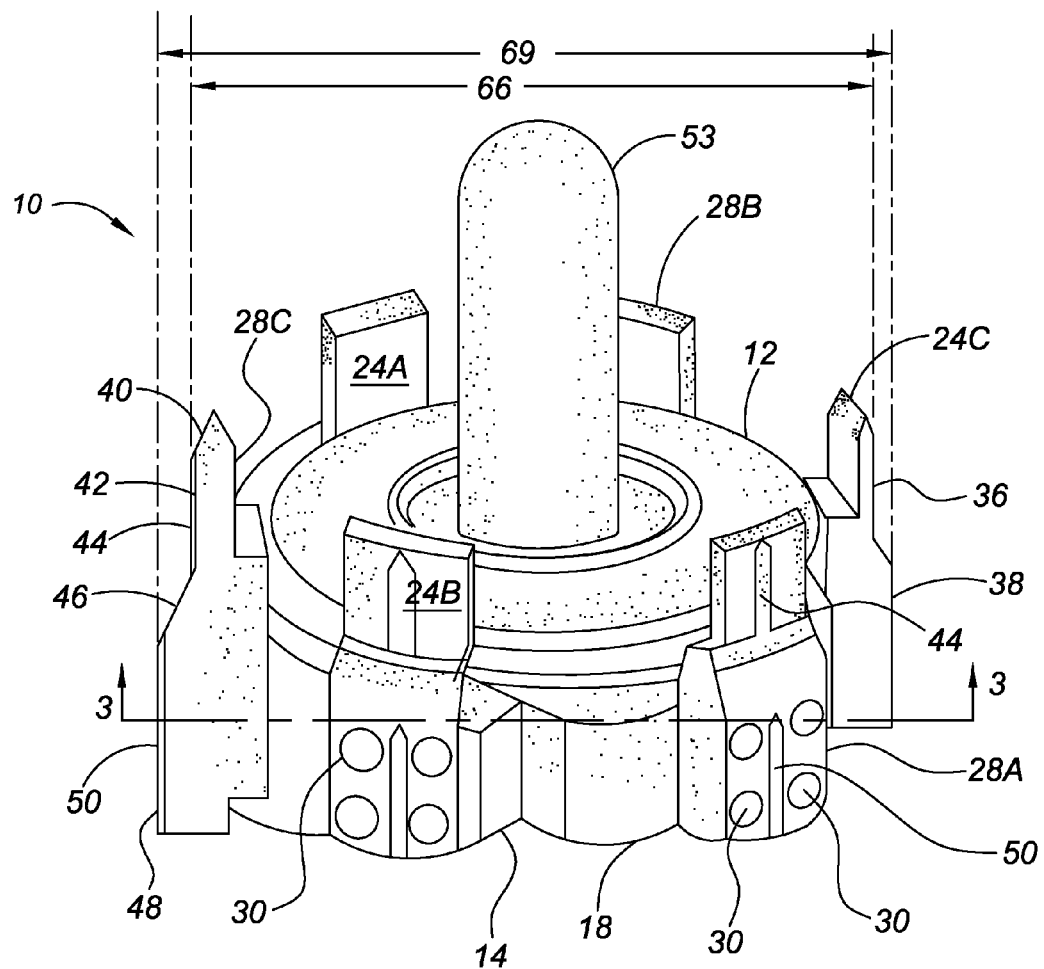
FIG. 1 is a partial perspective view of a fixture in accordance with a preferred embodiment of the invention.
Figure 2:
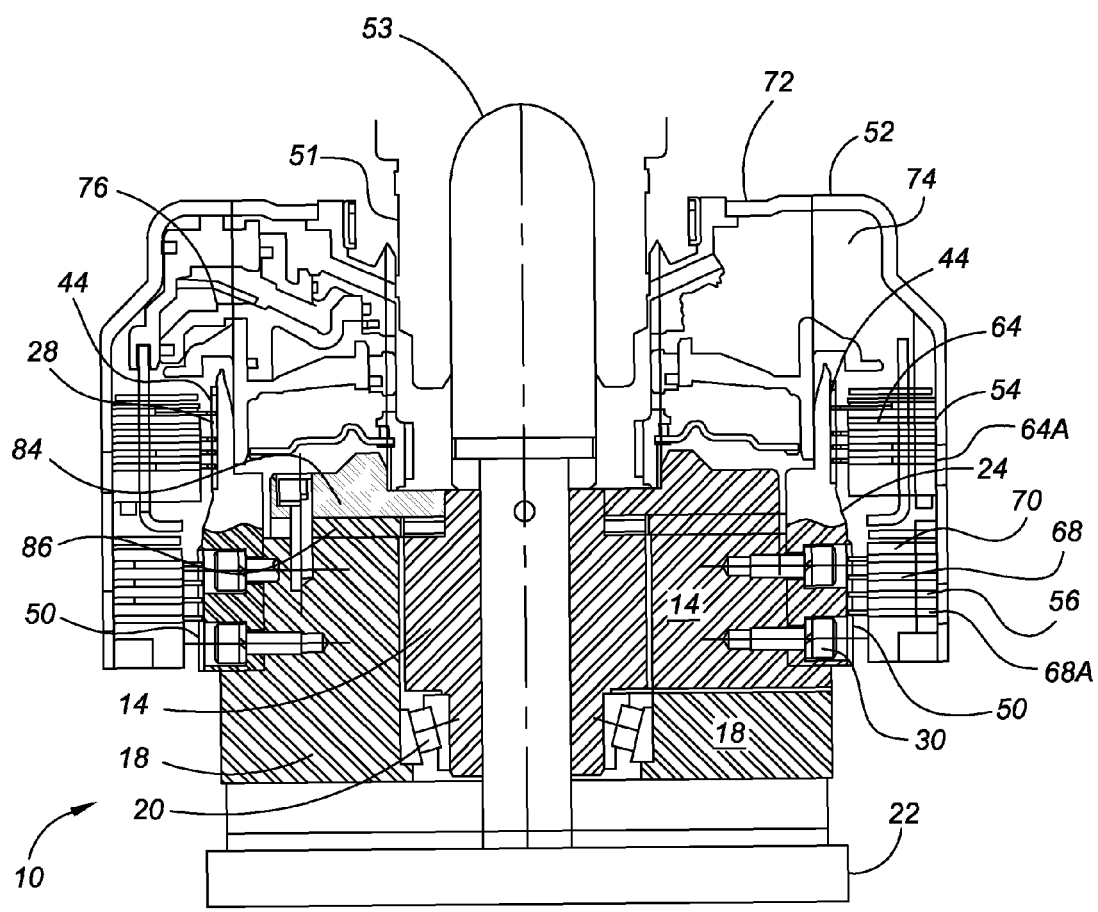
FIG. 2 is a partial sectional view of the fixture shown in FIG. 1 taken along axis 2-2 shown in FIG. 3, also showing a clutch housing assembly placed over the fixture.
Figure 3:
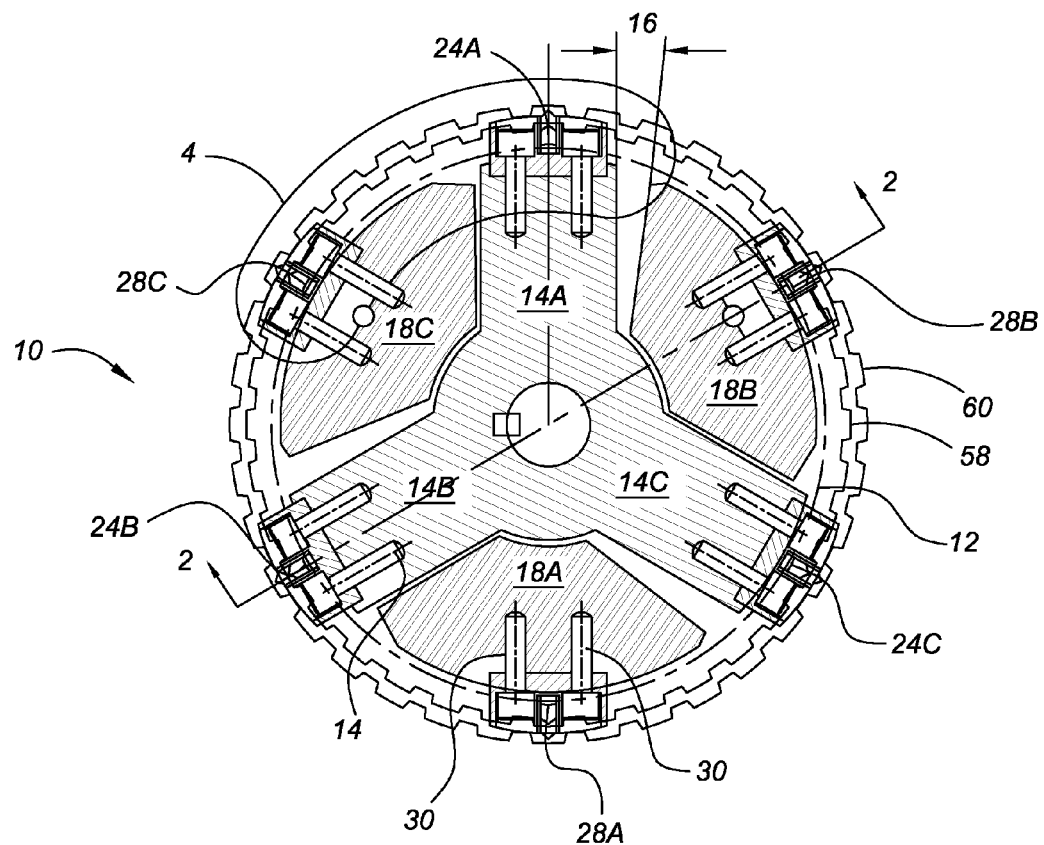
FIG. 3 is a partial sectional view of the fixture taken along axis 3-3 shown in FIG. 1.

A fixture to position and align the inner splines of multiple sets of clutch plates within a clutch housing assembly is provided. The fixture assists the installation of the clutch housing assembly into the vehicle transmission. FIG. 1 is a partial perspective view of the fixture 10 in accordance with a preferred embodiment of the invention. In all figures, like reference numbers refer to like items. FIG. 2 is a partial sectional view of the fixture 10 taken along the axis 2-2 shown in FIG. 3, also showing a clutch housing assembly 52 (described below) placed over the fixture 10. FIG. 3 is a partial sectional view of the fixture 10 taken along the axis 3-3 shown in FIG. 1.

As shown in FIGS. 1 and 3, the fixture 10 includes a central body 12. The central body 12 includes a movable part 14. The movable part 14 includes movable portions 14A, B and C which are rotatable or movable with respect to the central body 12. In the preferred embodiment, the movable portions 14A-C can rotate or oscillate back and forth in the direction shown at 16. The movable portions 14A-C are preferably integrally formed as one body (as shown in FIG. 3).

The central body 12 includes one or more fixed parts 18. The fixed part 18 includes fixed portions 18A, B and C which are fixed with respect to the central body 12. In the preferred embodiment, the fixed portions 18A, B and C are separately formed. A plurality of bearing joints 20 (shown in FIG. 2) may be used to connect the movable part 14 to the fixed parts 18. Alternative suitable connections may also be used. The entire fixture 10 is rigidly attached onto a platform 22.

A movable finger 24 is rigidly attached to each movable portion 14A-C. A fixed finger 28 is rigidly attached to each fixed portion 18A-C. As shown in FIGS. 1 and 3, first, second and third movable fingers 24A-C are rigidly attached to each of the movable portions 14A-C, respectively. As shown in FIGS. 1 and 3, first, second and third fixed fingers 28A-C are rigidly attached to each of the fixed portions 18A-C, respectively. The first, second and third fixed fingers 28A-C are fixed with respect to the central body 12. The movable fingers 24A-C can rotate or oscillate back and forth relative to the three fixed fingers 28A-C in the direction shown at 16. The movable fingers 24A-C are fixed with respect to the movable portions 14A-C, respectively, to which they are rigidly attached. A plurality of bolts 30 (see FIGS. 1, 2 and 3) may be used to attach each of the six fingers to their respective portions on the central body 12.

Alternatively, each of the six fingers may be integrally formed with their respective portions on the central body 12. The six fingers may be aligned substantially parallel to one another and arranged substantially symmetrically around the central body 12. Variation in the numbers of movable parts, fixed parts and fingers may be made within the scope of the invention.

Figure 4:
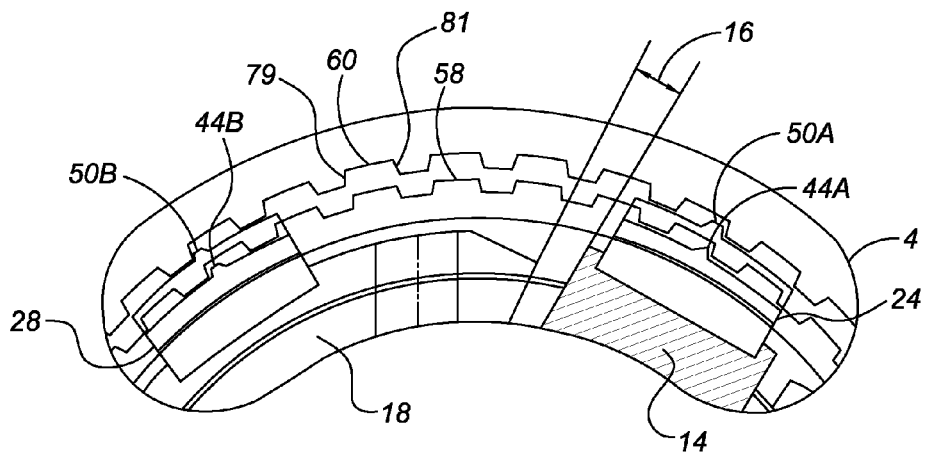
FIG. 4 is an enlarged view of the portion of FIG. 3 identified by the circled portion 4 shown in FIG. 3.

Each fixed finger 28 and movable finger 24 has a variable cross-section with a upper portion 36 and a lower portion 38. As seen in FIG. 1, the upper portion 36 of each finger includes a first tapered section 40 and a first straight section 42 having a first protrusion 44. The lower portion 38 of each finger includes a second tapered section 46 and a second straight section 48 having a second protrusion 50. FIG. 4 shows a sectional view of the first and second protrusions 44, 50.

A clutch housing assembly 52 may be mounted over the fixture 10. The fixture 10 includes a centering post 53 (shown in FIG. 1-2) to center the clutch housing assembly 52 as it is placed over the fixture 10. As shown in FIG. 2, the clutch housing assembly 52 includes a first set of clutch plates 54 and a second set of clutch plates 56. The first set of clutch plates 54 has first inner spline teeth 58 and the second set of clutch plates 56 has second inner spline teeth 60, shown in FIG. 4. FIG. 4 is an enlarged view of the circled portion 4 of FIG. 3. The first inner spline teeth 58 and second inner spline teeth 60 are configured to register around or engage with the first and second protrusions 44, 50, respectively, of each of the six fingers, as shown in FIGS. 4, 2 and discussed below.

The first set of clutch plates 54 includes a plurality of annular, flat reaction plates 64. In order for the clutch housing assembly 52 to be sufficiently fittable over the upper part of the fixture 10, the plates 64 have an inside diameter slightly exceeding the upper outer diameter 66 of the fixture 10, where the upper outer diameter 66 is defined as the diameter of a circle connecting or encapsulating the upper portion 36 of each finger. The second set of clutch plates 56 includes a plurality of annular, flat reaction plates 68. In order for the clutch housing assembly to be sufficiently fittable over the lower part of the fixture 10, the plates 68 each have an inside diameter slightly exceeding the lower outer diameter 69 of the fixture 10, where the lower outer diameter 69 is defined as the diameter of a circle connecting or encapsulating the lower portion 38 of each finger.

There are typically about ten to eleven steel and fiber plates in each set of clutch plates. A plurality of smaller flat friction plates 70 are interposed between the reaction plates 64 in the first set of clutch plates 54 and the reaction plates 68 in the second set of clutch plates 56. The clutch housing assembly 52 further includes a bowl-shaped housing or drum 72 enclosing a chamber 74 which includes a circuit 76 through which hydraulic fluid is ordinarily flown through. Variation in the numbers of sets of clutch plates and number of plates within a set may be made within the scope of the invention.

Operation

The clutch housing assembly 52 is delivered to an operator on an assembly line. The operator generally picks up the clutch housing assembly 52 utilizing a lift-assist device 51 (only partially shown), with the drum or housing facing downward. The first and second sets of clutch plates 54, 56 are pre-loaded in the clutch housing assembly 52. The outer spline teeth of the first and second sets of clutch plates 54, 56 are generally pre-aligned.

The clutch housing assembly 52 is placed onto the fixture 10, utilizing the centering post 53 to center the clutch housing assembly 52. The movable portions 14A-C of the fixture 10 rotate or oscillate back and forth in the direction shown at 16, resulting in the three movable fingers 24A-C (which are rigidly attached to the movable portions 14A-C) oscillating back and forth relative to the three fixed fingers 28A-C. A rotary actuator (not shown) or other suitable device may be used to oscillate the movable fingers 24A-C. The rotary actuator includes a switch to reverse the direction of oscillation. In the preferred embodiment, the angle of oscillation is approximately 8 degrees. The angle of oscillation depends on the diameter of the inner splines and the number of teeth.

The first set of clutch plates 54 descends through the first tapered section 40 (shown in FIG. 1) of each the six fingers by gravity, into the first straight section 42. As the movable fingers 24 oscillate back and forth, the first inner spline teeth 58 (shown in FIG. 4) of the first set of clutch plates 54 register around or engage with the first protrusion 44 (shown in FIGS. 1, 2, 4) of each of the six fingers.

The second set of clutch plates 56 descends through the second tapered section 46 (shown in FIG. 1) of each the six fingers by gravity into the second straight section 48. As the movable fingers 24 oscillate back and forth, the second inner spline teeth 60 (shown in FIG. 4) of the second set of clutch plates 56 register around or engage with the second protrusion 50 (shown in FIGS. 1, 2, 4) of each of the six fingers.

The first and the second set of clutch plates 54, 56 may engage the first and second tapered sections 40, 46 and then the first and second straight sections 42, 48 of the movable and fixed fingers 24A-C, 28 A-C at approximately the same point or slightly ahead or slightly behind the other.

The rotational action (oscillation back and forth) facilitates a smooth and speedy alignment of the plates within the set by allowing the respective inner spline teeth to locate and register around the first and second protrusions 44, 50. As the inner spline teeth of the first and second bottom plates 64A, 68A (in the first and second sets of clutch plates 54, 56, respectively) are aligned, the first and second bottom plates 64A, 68A descend by gravity down and around the respective protrusions, allowing the plate above it to be aligned in turn. This allows the inner spline teeth of each individual plate in the set to be aligned one by one, from the bottom to the top of the first and second sets of clutch plates 54, 56.

The alignment of the inner spline teeth of the clutch plates is held in place by the first and second protrusions 44, 50 on each of the six fingers. As shown in FIG. 4, the first and second protrusions 44A, 50A on each movable finger 24 align in an opposite orientation with respect to the first and second protrusions 44B, 50B on each fixed finger 28, i.e., they are fully indexed. For example, the first and second protrusions 44B, 50B on the fixed finger 28 hook onto a left edge 79 of the first and second inner spline teeth 58, 60, while the first and second protrusions 44A, 50A on the movable finger 24 hook onto a right edge 81 of the first and second inner spline teeth 58, 60 (as shown in FIG. 4).

The fixture 10 further includes a control feature to allow the movable fingers 24A-C to be stopped at the maximum point of travel, i.e., when the respective inner spline teeth 58, 60 have registered around the first and second protrusions 44, 50, to ensure that each clutch plates is fully aligned prior to being locked into this position. The opposite orientation or full indexing of the first and second protrusions 44, 50 allows the alignment of the respective inner spline teeth 58, 60 to be held in place, i.e., it prevents the clutch plates in the first and second sets of clutch plates 54, 56 from rotating further and losing the correct alignment.

Once the clutch housing assembly 52 is fully seated onto the fixture 10, the correctly aligned clutch plates are locked into position by introducing compressed air into the circuit 76 in the chamber 74 within the bowl-shaped housing or drum 72 of the clutch housing assembly 52. Hydraulic fluid is ordinarily flown through the circuit 76. An end cover 84 is placed above the central body 12 to ensure a sufficiently tight fit of the clutch housing assembly 52 as it is placed above the fixture 10. A friction liner 86 is placed below the end cover 84 to retain the end cover 84 in place. The correctly aligned clutch housing assembly 52 is lifted off the fixture 10 and may be installed into the transmission.

While the best modes for carrying out the invention have been described in detail, those familiar with the art to which this invention relates will recognize various alternative designs and embodiments for practicing the invention within the scope of the appended claims.

The invention claimed is:

1. A fixture for alignment of a plurality of splined plates within an assembly, the fixture comprising:
   a central body;
   a first fixed finger integrally formed with or rigidly attached to a first fixed portion of said central body;
   a first movable finger integrally formed with or rigidly attached to a first movable portion of said central body;
   wherein said first movable finger is free to oscillate back and forth relative to said first fixed finger to assist the alignment of said plurality of splined plates within said assembly; and
   wherein said first movable portion is attached to said first fixed portion through at least one bearing joint.

2. The fixture of claim 1, further comprising:
   a second and a third fixed finger integrally formed with or rigidly attached to a second and a third fixed portion, respectively, of said central body;
   a second and a third movable finger integrally formed with or rigidly attached to a second and a third movable portion, respectively, of said central body; and
   wherein said second and said third movable finger are free to oscillate back and forth relative to said second and said third fixed fingers to assist the alignment of said plurality of splined plates within said assembly.

3. The fixture of claim 2:
   wherein said first, said second and said third fixed and movable fingers are arranged substantially symmetrically around said central body; and
   wherein said first, said second and said third fixed and movable fingers are aligned substantially parallel to one another.

4. The fixture of claim 1 in combination with said assembly:
   wherein said assembly is a clutch housing assembly; and
   said plurality of splined plates include a first set of clutch plates having first inner spline teeth and a second set of clutch plates having second inner spline teeth.

5. The fixture of claim 4:
   wherein said first fixed finger and said first movable finger have a variable cross-section including an upper portion and a lower portion;
   wherein said upper portion of said first fixed finger and said first movable finger includes a first tapered section and a first straight section having a first protrusion, said first protrusion being configured to engage with said first inner spline teeth of said first set of clutch plates; and
   wherein said lower portion of said first fixed finger and said first movable finger includes a second tapered section and a second straight section having a second protrusion, said second protrusion being configured to engage with said second inner spline teeth of said second set of clutch plates.

6. The fixture of claim 5, wherein:
   said first set of clutch plates have an inside diameter sufficiently exceeding an upper outer diameter of said fixture such that said clutch housing assembly is sufficiently fittable over said fixture; and
   said second set of clutch plates have an inside diameter sufficiently exceeding a lower outer diameter of said fixture such that said clutch housing assembly is sufficiently fittable over said fixture.

7. The fixture of claim 6:
wherein said clutch housing assembly is placed onto said fixture;
wherein said first movable finger oscillates back and forth allowing said first and said second inner spline teeth to locate and register around said first and said second protrusion, respectively, thereby aligning said first and said second inner spline teeth;
wherein a first bottom plate in said first set of clutch plates descends by gravity down said first protrusion as said first inner spline teeth register around said first protrusion, allowing a plate above said first bottom plate in said first set of clutch plates to be aligned in turn; and
wherein a second bottom plate in said second set of clutch plates descends by gravity down said second protrusion as said second inner spline teeth register around said second protrusion, allowing a plate above said second bottom plate in said second set of clutch plates to be aligned in turn.

8. The fixture of claim 7, wherein said movable finger defines an angle of oscillation of approximately 8 degrees.

9. The fixture of claim 7, wherein:
said first protrusion on said first movable finger hooks onto one edge of said first inner spline teeth of said first set of clutch plates;
said first protrusion on said first fixed finger hooks onto a remaining other edge of said first inner spline teeth of said first set of clutch plates;
said second protrusion on said first movable finger hooks onto one edge of said second inner spline teeth of said second set of clutch plates;
said second protrusion on said first fixed finger hooks onto a remaining other edge of said second inner spline teeth of said second set of clutch plates; and
wherein the opposite orientation of said first and second protrusions on said first movable and fixed fingers holds the alignment of said first and said second sets of clutch plates in place.

10. The fixture of claim 9, further comprising a centering post to center said clutch housing assembly as said clutch housing assembly is placed over said fixture.

11. The fixture of claim 10,
wherein said clutch housing assembly further includes a housing enclosing a circuit to allow flow of fluid; and
wherein said first set and said second set of clutch plates are locked into position by introducing compressed air into said circuit once said clutch housing assembly is fully seated onto said fixture.

12. A method of aligning a plurality of clutch plates within a clutch housing assembly, comprising:
placing said clutch housing assembly onto a fixture, wherein said fixture includes:
a central body;
a first fixed finger mounted or integrally formed on a first fixed portion of said central body;
a first movable finger mounted or integrally formed on a first movable portion of said central body;
wherein said clutch housing assembly includes:
a first set of clutch plates with a plurality of plates having first inner spline teeth; and
a second set of clutch plates with a plurality of plates having second inner spline teeth;
descending said first set of clutch plates by gravity through a first tapered section of said first movable and said first fixed fingers into a first straight section;
descending said second set of clutch plates by gravity through a second tapered section of said first movable and said first fixed fingers into a second straight section; and
oscillating said first movable finger back and forth with respect to said first fixed finger to allow said first and said second inner spline teeth of said first set and said second set of clutch plates to locate and register around a first protrusion and a second protrusion, respectively, on said first movable and first fixed fingers.

13. The method of claim 12, further comprising:
descending a first bottom plate in said first set of clutch plates by gravity down and around said first protrusion as said first inner spline teeth register around said first protrusion, allowing a plate above said first bottom plate in said first set of clutch plates to be aligned in turn; and
descending a second bottom plate in said second set of clutch plates by gravity down and around said second protrusion as said second inner spline teeth register around said second protrusion, allowing a plate above said second bottom plate in said second set of clutch plates to be aligned in turn.

14. A fixture for alignment of a plurality of clutch plates within a clutch housing assembly, the fixture comprising:
a central body;
first, second and third fixed fingers integrally formed or mounted to a first, second and third fixed portion, respectively, of said central body;
first, second and third movable fingers integrally formed or mounted to a first, second and third movable portion, respectively, of said central body;
wherein said first, said second and said third movable fingers are free to oscillate back and forth relative to said first, said second and said third fixed fingers to assist the alignment of said plurality of clutch plates within said clutch housing assembly; and
wherein said clutch housing assembly includes a first set of clutch plates having first inner spline teeth and a second set of clutch plates having second inner spline teeth.

15. The fixture of claim 14:
wherein said first fixed finger and said first movable finger have a variable cross-section including an upper portion and a lower portion;
wherein said upper portion of said first fixed finger and said first movable finger includes a first tapered section and a first straight section having a first protrusion;
wherein said lower portion of said first fixed finger and said first movable finger includes a second tapered section and a second straight section having a second protrusion;
wherein said first protrusion is configured to engage with said first inner spline teeth of said first set of clutch plates; and
wherein said second protrusion is configured to engage with said second inner spline teeth of said second set of clutch plates.

* * * * *